United States Patent
Zhang et al.

(10) Patent No.: US 12,465,905 B2
(45) Date of Patent: Nov. 11, 2025

(54) OXYGEN-VACANCY-RICH MoO$_x$/ZrO$_2$ CATALYST AND PREPARATION METHOD AND APPLICATION THEREOF IN HYDRODEOXYGENATION OF BIOMASS GAS-SOLID SYSTEM

(71) Applicant: SOUTHEAST UNIVERSITY, Nanjing (CN)

(72) Inventors: Huiyan Zhang, Nanjing (CN); Yi Gao, Nanjing (CN); Jiajun Yu, Nanjing (CN); Shipeng Ding, Nanjing (CN); Rui Xiao, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 19/209,844

(22) Filed: May 16, 2025

(65) Prior Publication Data
US 2025/0276306 A1    Sep. 4, 2025

Related U.S. Application Data

(63) Continuation of application No. PCT/CN2024/124491, filed on Oct. 12, 2024.

(30) Foreign Application Priority Data

Jan. 24, 2024    (CN) .......................... 202410100505.9

(51) Int. Cl.
*B01J 23/652* (2006.01)
*B01J 21/06* (2006.01)
(Continued)

(52) U.S. Cl.
CPC ......... *B01J 23/6525* (2013.01); *B01J 21/066* (2013.01); *B01J 23/28* (2013.01);
(Continued)

(58) Field of Classification Search
CPC .... B01J 23/6525; B01J 35/394; B01J 21/066; B01J 23/28; B01J 37/0036;
(Continued)

(56) References Cited

U.S. PATENT DOCUMENTS

| 8,366,907 B2* | 2/2013 | Hallen ................ B01J 21/066 |
| | | 585/737 |
| 2011/0301021 A1* | 12/2011 | Liu ..................... C07C 29/60 |
| | | 502/308 |

(Continued)

FOREIGN PATENT DOCUMENTS

| CN | 104428060 A | 3/2015 |
| CN | 104744204 A | 7/2015 |

(Continued)

*Primary Examiner* — Patricia L. Hailey
(74) *Attorney, Agent, or Firm* — Bayramoglu Law Offices LLC

(57) ABSTRACT

Provided are an oxygen-vacancy-rich MoO$_x$/ZrO$_2$ catalyst and a preparation method and its application in hydrodeoxygenation of a biomass gas-solid system. The method includes the following steps: (1) dissolving zirconyl nitrate and ammonia water in de-ionized water respectively and then mixing fully and performing aging, cooling, filtering, washing and drying to obtain a solid powder and calcining the solid powder to obtain ZrO$_2$ solid; (2) adding ammonium molybdate tetrahydrate into de-ionized water for dissolution, stirring and dropwise adding into the ZrO$_2$ solid, and mixing to make loading uniform, and then drying to obtain a solid, and then grinding and calcining the solid to obtain MoO$_x$/ZrO$_2$ powder; (3) adding a Pt precursor into de-ionized water for dissolution, and dropwise adding into the MoO$_x$/ZrO$_2$ powder and stirring to make loading uniform, and then drying to obtain a solid, and then grinding and calcining the solid to obtain the Pt—MoO$_x$/ZrO$_2$ catalyst.

9 Claims, 2 Drawing Sheets

(51) Int. Cl.
*B01J 23/28* (2006.01)
*B01J 35/30* (2024.01)
*B01J 37/00* (2006.01)
*B01J 37/02* (2006.01)
*B01J 37/04* (2006.01)
*B01J 37/08* (2006.01)
*B01J 37/18* (2006.01)
*C08H 7/00* (2011.01)

(52) U.S. Cl.
CPC ......... *B01J 35/394* (2024.01); *B01J 37/0036* (2013.01); *B01J 37/0201* (2013.01); *B01J 37/0236* (2013.01); *B01J 37/024* (2013.01); *B01J 37/04* (2013.01); *B01J 37/08* (2013.01); *B01J 37/18* (2013.01); *C08H 6/00* (2013.01)

(58) Field of Classification Search
CPC .............. B01J 37/02021; B01J 37/0236; B01J 37/024; B01J 37/04; B01J 37/08; B01J 37/18; C08H 6/00

USPC ........... 502/308, 339; 423/594.12, 606, 608; 530/500–503

See application file for complete search history.

(56) References Cited

U.S. PATENT DOCUMENTS

2013/0079566 A1* 3/2013 Lin .......................... B01J 23/34
585/242
2014/0031546 A1* 1/2014 Shen .................... B01J 23/6486
585/277

FOREIGN PATENT DOCUMENTS

| CN | 110237836 A | * | 9/2019 | ............. B01J 23/28 |
| CN | 114130419 A | | 3/2022 | |
| CN | 117942995 A | | 4/2024 | |

* cited by examiner

OXYGEN-VACANCY-RICH MoO$_x$/ZrO$_2$ CATALYST AND PREPARATION METHOD AND APPLICATION THEREOF IN HYDRODEOXYGENATION OF BIOMASS GAS-SOLID SYSTEM

CROSS REFERENCE TO THE RELATED APPLICATIONS

This application is a continuation application of International Application No. PCT/CN2024/124491, filed on Oct. 12, 2024, which is based upon and claims priority to Chinese Patent Application No. 202410100505.9, filed on Jan. 24, 2024, the entire contents of which are incorporated herein by reference.

TECHNICAL FIELD

The present disclosure relates to the field of biomass high-value utilization and in particular to a Pt-doped oxygen-vacancy-rich MoO$_x$/ZrO$_2$ catalyst and a preparation method and its application in hydrodeoxygenation of a gas-solid system of a biomass-derived compound.

BACKGROUND

Aromatic hydrocarbon (benzene, toluene and xylene etc.) as one important raw material in the chemical industry is an indispensable resource for the industries such as plastics, phenylamine, synthetic resin and pharmaceuticals. Along with the development of oil refining and petroleum industry, the production of aromatic hydrocarbon gradually shifts from coal tar to catalytic reforming and cracking of naphtha. However, with the increasing depletion of fossil fuels and the increasing severity of greenhouse effect arising from consumption of a huge quantity of fossil energy, a profound pressure is brought to the ecological environment. The biomass is a low-sulfur, low-carbon and carbon-neutral renewable energy, which is abundant in reserve and therefore can be an ideal substitute for the fossil energy. Therefore, the method of developing a green renewable biomass resource and preparing aromatic hydrocarbon by catalytic pyrolysis technology has drawn wide attention of the people.

Lignocellulosic biomass is the most abundant renewable hydrocarbon which can be used for production of energy, fuels and chemical products. As a component with the most complex structure in the lignocellulosic biomass, lignin is the sole renewable energy capable of providing a huge amount of aromatic compound in the world, which can be de-polymerized to produce a phenolic compound in which a large number of oxygen-containing functional groups combined onto the aromatic rings are difficult to remove. Catalytic hydrodeoxygenation (HDO) can be an efficient method used for C—O bond breakage of lignin-derived phenols. The HDO reaction has two parallel catalytic paths: one path is aromatic ring hydrogentation (HYD) to perform hydrogenation on the aromatic ring first and then perform further hydrogentation and dehydration; the other is direct breakage of the C—O bond (DDO) to break the C—O bond while retaining the complete aromatic ring. This cracking method is more favorable under high temperature and high pressure and can effectively lower the possibility of over-hydrogenation of the aromatic ring and selectively generate the target product aromatic hydrocarbon while consuming the smallest amount of H$_2$. However, the bond energy on the C—O bond of the aromatic ring is high, and thus it is a big challenge to break the bond. These two approaches can enable the phenolic substances to be further converted into aromatic hydrocarbon or cycloalkane. The product selectivity differs greatly depending on temperature, pressure and catalyst structure.

Given the excellent low-temperature activity and hydrogenation performance of the noble metals, the noble metals usually provide hydrogenation active sites for the HDO reaction while the carriers or introduced acid oxides provide acid sites for the catalytic dehydration reaction. But the noble metals have the disadvantage of ease of agglomeration and deactivation, leading to easy occurrence of aromatic ring hydrogenation under high pressure. Furthermore, their high costs and resource limitation also cannot be neglected. MoO$_3$ is an extremely attractive catalyst used for the HDO of various biomass-derived oxygen-containing compounds. Also, the metal molybdenum is cheap. More importantly, MoO$_3$ can selectively break the C—O bond, and can have high activity and high aromatic hydrocarbon selectivity under low H$_2$ pressure. In the prior arts, the MoO$_3$ can be used to catalyze the lignin-derived bio-oil HDO under the temperature of 450° C., with a deoxygenation rate being 52% and the yield of the organic liquid rich in aromatic hydrocarbon being about 16.2 wt %. A part of Mo$^{6+}$ is reduced to Mo$^{5+}$ under the action of H$_2$, and a synergic effect is generated between the two metals Mo with different valence states to realize HDO reaction. However, during the HDO process, the Mo$^{5+}$ species may be easily over-reduced to Mo$^{4+}$, leading to deactivation of the catalyst. Under high temperature, coke can be easily formed on the surface of the catalyst, leading to the deactivation of the catalyst. Further, the catalyst itself may suffer sintering deactivation due to structural change. Therefore, it is necessary to develop a catalyst with excellent activity, selectivity and stability to realize efficient hydrodeoxygenation on a lignin-derived compound under mild conditions for preparation of aromatic hydrocarbon.

SUMMARY

In order to overcome the above defects in the prior arts, the present disclosure provides an oxygen-vacancy-rich MoO$_x$/ZrO$_2$ catalyst and a preparation method and its application in hydrodeoxygenation of a biomass gas-solid system. The catalyst prepared by the method has high catalytic activity and good stability and can solve the problem of low yield of target product aromatic hydrocarbon currently converted from lignin and its derivative phenolic compounds through hydrodeoxygenation.

The object of the present disclosure can be carried out by the following technical solution:

A preparation method of an oxygen-vacancy-rich MoO$_x$/ZrO$_2$ catalyst in hydrodeoxygenation of a biomass gas-solid system, including the following steps:

(1) preparation of oxygen-vacancy-rich ZrO$_2$: dissolving zirconyl nitrate and ammonia water in de-ionized water respectively and then mixing fully and performing aging, cooling, filtering, washing and drying to obtain a solid powder and calcining the solid powder in the air atmosphere to obtain ZrO$_2$ solid;

(2) adding ammonium molybdate tetrahydrate into de-ionized water for dissolution, stirring and dropwise adding into the ZrO$_2$ solid obtained in the step (1), and mixing to make loading uniform, and then drying to obtain a solid, and then grinding the solid and calcining in the air atmosphere to obtain MoO$_x$/ZrO$_2$ powder;

(3) adding a Pt precursor into de-ionized water for dissolution, and dropwise adding into the MoO$_x$/ZrO$_2$ powder obtained in the step (2) and stirring to make loading uniform, and then drying to obtain a solid, and then grinding the solid and calcining in the air atmosphere to obtain the Pt—MoO$_x$/ZrO$_2$ catalyst.

Furthermore, in the step (1), a mixture aging temperature is 80 to 120° C. with a time of 12 to 36 h.

Furthermore, in the step (1), the calcination condition is a temperature 300 to 500° C., a heating rate 5 to 8° C./min, and a holding time 2 to 4 h;

in the step (2), the calcination condition is a temperature 450 to 800° C., a heating rate 5 to 8° C./min, and a holding time 2 to 4 h;

in the step (3), the calcination condition is a temperature 450 to 800° C., a heating rate 5 to 8° C./min, and a holding time 2 to 4 h.

Furthermore, the loading of the noble metal Pt in the obtained Pt—MoO$_x$/ZrO$_2$ catalyst is 0.1 to 1%.

The present disclosure provides an oxygen-vacancy-rich MoO$_x$/ZrO$_2$ catalyst in hydrodeoxygenation of the biomass gas-solid system, prepared by the method, wherein the catalyst is Pt—MoO$_x$/ZrO$_2$, wherein the loading of the noble metal Pt is 0.1 to 1%, and x is 2 to 3.

The present disclosure provides an application of the oxygen-vacancy-rich MoO$_x$/ZrO$_2$ catalyst in hydrodeoxygenation of the biomass gas-solid system, wherein the Pt—MoO$_x$/ZrO$_2$ catalyst is applied to hydrodeoxygenation reaction of lignin and its derivative phenolic compounds.

Furthermore, the hydrodeoxygenation reaction proceeds in a fixed bed with a reaction temperature of 350 to 450° C.

Furthermore, the hydrodeoxygenation reaction proceeds under normal pressure to avoid use of high-pressure hydrogen in the traditional hydrogenation reaction and reduce the consumption of hydrogen.

The hydrodeoxygenation reaction is specifically as follows: the catalyst and silicon dioxide are ground and mixed uniformly at a weight ratio of 5 to 30:200 and loaded between two layers of quartz wool and placed in the middle of the fixed bed. Before reaction, the reactor firstly exhausts in-tube residual air with N$_2$, and then is heated to 350 to 450° C. at the heating rate of 5 to 15° C./min in the H$_2$ atmosphere, and held for 20 to 40 min at this temperature to fully activate the catalyst. The lignin and its derivative phenolic compounds are sent into the reactor via an injection pump and mixed with H$_2$ at an inlet of the reactor, and a flow rate of reactants is adjusted to obtain a Weight Hourly Space Velocity (WHSV) value. A tail of the reactor is connected with two levels of condensation tube, a gas product is collected by an airbag, and qualitative and quantitative analyses are performed with GC/MS and GC-FID.

The bifunctional catalyst has shown high activity and has drawn more and more attention. The metals (Pt, Pd, Ru and the like) adsorb and activate H$_2$ molecules and the activated proton hydrogen overflows to the carrier surface, providing additional active sites for hydrogenation reaction. It is demonstrated that the interaction between the Pt and different oxides obviously affects the selectivity of the target product. Furthermore, the reducible metal oxides can greatly improve, with oxygen vacancies, the adsorption capability of —OH group on the catalyst, helping direct deoxygenation under high temperature and low pressure. The close binding of the active sites affects the selectivity of the aromatic hydrocarbon. Compared with the prior arts, the present disclosure has the following beneficial effects.

The catalyst prepared by the method of the present disclosure can enable the hydrogen-activated metal Pt to be highly dispersed on the carrier surface, thereby increasing the hydrodeoxygenation activity; meanwhile, the oxygen-vacancy-rich ZrO$_2$ carrier can absorb active hydrogen formed by overflowing hydrogen, promoting catalytic activity, increasing the stability and effectively inhibiting over-reduction of the Mo species.

The hydrogen-activated metal-doped MoO$_x$ catalyst has the effect of greatly enhancing stability and catalytic activity and the carrier with high specific surface area can greatly improve the dispersity of the active molybdenum species and adjust geometrical configuration and electron structure. The rich oxygen vacancies can effectively inhibit the deactivation of the catalyst arising from the over-reduction of the Mo species, thereby further improving the stability of the catalyst.

When hydrodeoxygenation is performed on the biomass-derived compounds, the C—O bond can be selectively broken under normal pressure, the conversion rate and the deoxygenation rate can reach 100% and 97.5% respectively, and the selectivity of the target aromatic hydrocarbon products benzene, toluene and xylene (BTX) can reach as high as 95%.

DETAILED DESCRIPTION OF THE EMBODIMENTS

Figure 1:
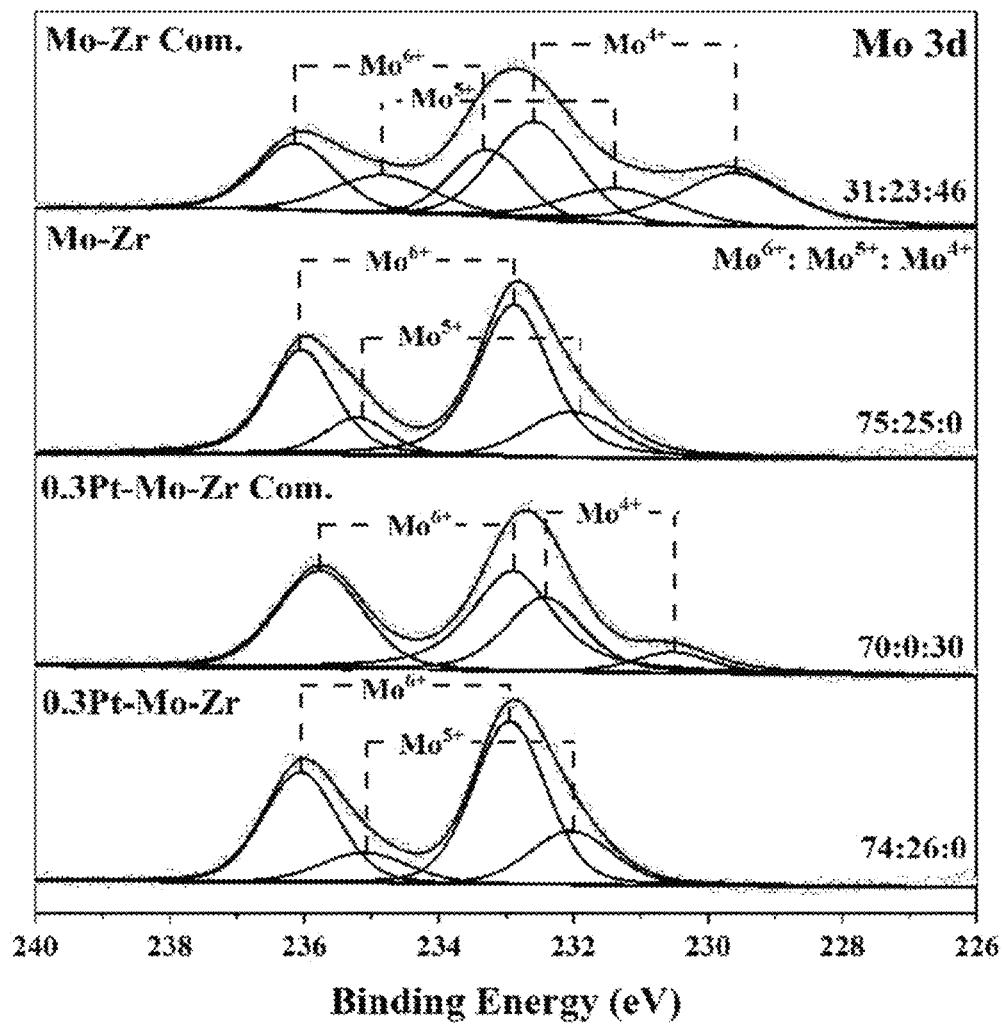
FIG. 1 is a characterization diagram of XPS of catalysts of the examples 1 and 2, and the control examples 1 and 2 of the present disclosure.

The present disclosure will be detailed below with the drawings and specific examples.

The present disclosure provides an oxygen-vacancy-rich MoO$_x$/ZrO$_2$ catalyst and a preparation method and its application in hydrodeoxygenation of a biomass gas-solid system. The present disclosure will be further detailed below with the following examples. The described examples are used only to interpret the present disclosure rather than limit the present disclosure.

Various raw materials used in the present disclosure are all commercially available products in the fields.

The zirconyl nitrate used in the present disclosure has the CAS number 14985-18-3 and the molecular formula H$_2$N$_2$O$_8$Zr and the molecular weight 249.25.

Example 1

11.35 g of zirconyl nitrate was taken and dissolved in de-ionized water to prepare 61.4 mL of solution and stirred for 2 h to realize full dissolution; 9.72 mL of strong ammonia water was taken and dissolved in de-ionized water to prepare 180 mL of dilute ammonia water solution; the zirconyl nitrate solution was dropwise added to the dilute ammonia water solution and stirred fully for 2 h with a magnetic stirrer and then placed in a 100° C. drying oven for 24 h aging; after the mixture solution was cooled to room temperature, the mixture solution was suction-filtered with a vacuum pump and washed to neutral with de-ionized water, and then placed into a 100° C. drying oven for drying of 12 h; the dried solid was placed into a mortar and fully ground into powder, and next placed into a muffle furnace and quickly heated to 400° C. at the heating rate of 5° C./min, and held for 4 h at this temperature so as to obtain a solid powder as ZrO$_2$.

0.55 g of ammonium molybdate tetrahydrate was dissolved in 6 mL of de-ionized water and stirred for 2 h for full dissolution, and dropwise added to 4.5 g of $ZrO_2$ and stirred for 8 h to make loading uniform, and then placed into a 100° C. drying oven for drying of 12 h; the dried solid was placed into a mortar and fully ground into powder, and next placed into a muffle furnace and quickly heated to 550° C. at the heating rate of 5° C./min, and held for 3 h at this temperature to obtain a solid powder as $MoO_x/ZrO_2$.

Chloroplatinic acid hexahydrate was dissolved in de-ionized water to prepare 5 mL of solution, and a given volume of solution was taken out to make the Pt loading be 0.3%, and dropwise added to the $MoO_x/ZrO_2$ catalyst prepared in the above preparation method, and then stirred for 8 h with a magnetic stirrer to make the loading uniform, and then placed into a 100° C. drying oven for drying of 12 h; the dried solid was placed into a mortar and fully ground to a powder and next placed into a muffle furnace and quickly heated to 550° C. at the heating rate of 5° C./min and held for 3 h at this temperature to obtain 0.3% Pt—$MoO_x/ZrO_2$ catalyst.

For the performance test of the catalyst, the hydrodeoxygenation reaction of guaiacol was carried out on a fixed bed reactor. 30 mg of catalyst and 200 mg of silicon dioxide were ground and mixed uniformly and loaded between two layers of quartz wool and placed in the middle of the fixed bed. Before reaction, the reactor firstly exhausted in-tube residual air with 80 mL/min $N_2$ and then was heated to 400° C. at the heating rate of 10° C./min in the normal-pressure $H_2$ atmosphere of 60 mL/min, and held for 30 min at this temperature to fully activate the catalyst. The guaiacol was sent into the reactor via an injection pump. The WHSV of the feed rate of the guaiacol relative to the use amount of the catalyst was 2.26 $h^{-1}$. The liquid product was collected by a condensation system of ice water bath and the gas product was collected by an airbag.

Qualitative and quantitative analyses were performed on hydrodeoxygenation products with GC/MS and GC-FID. The results showed that the conversion rate of the guaiacol was 100%, the deoxygenation rate was 97.5%, the BTX selectivity was 95% and the selectivity of the phenolic compounds was 5%.

Example 2

The effect of different Pt loadings on the hydrodeoxygenation of the lignin-derived phenolic compounds: chloroplatinic acid hexahydrate was dissolved in de-ionized water to prepare 5 mL of solution, and a given volume of solution was taken out to make the Pt loading be 0.1%, and dropwise added to the $MoO_x/ZrO_2$ catalyst prepared in the above preparation method, and then stirred for 8 h with a magnetic stirrer to make the loading uniform, and then placed into a 100° C. drying oven for drying of 12 h; the dried solid was placed into a mortar and fully ground to a powder and next placed into a muffle furnace and quickly heated to 550° C. at the heating rate of 5° C./min and held for 3 h at this temperature to obtain 0.1% Pt—$MoO_x/ZrO_2$ catalyst.

The performance test method of the catalyst was the same as in the example 1, and the qualitative and quantitative analyses were performed on the hydrodeoxygenation products with GC/MS and GC-FID. The results showed that the conversion rate of the guaiacol was 93%, the deoxygenation rate was 46.5%, the phenol selectivity was 63%, and the cresol selectivity was 37%.

Example 3

The effect of different Pt loadings on the hydrodeoxygenation of the lignin-derived phenolic compounds: chloroplatinic acid hexahydrate was dissolved in de-ionized water to prepare 5 mL of solution, and a given volume of solution was taken out to make the Pt loading be 0.5%, and dropwise added to the $MoO_x/ZrO_2$ catalyst prepared in the above preparation method, and then stirred for 8 h with a magnetic stirrer to make the loading uniform, and then placed into a 100° C. drying oven for drying of 12 h; the dried solid was placed into a mortar and fully ground to a powder and next placed into a muffle furnace and quickly heated to 550° C. at the heating rate of 5° C./min and held for 3 h at this temperature to obtain 0.5% Pt—$MoO_x/ZrO_2$ catalyst.

The performance test method of the catalyst was the same as in the example 1, and the qualitative and quantitative analyses were performed on the hydrodeoxygenation products with GC/MS and GC-FID. The results showed that the conversion rate of the guaiacol was 100%, the deoxygenation rate was 96%, the BTX selectivity was 92%, and the selectivity of the phenolic compounds was 8%.

Example 4

The effect of different Pt loadings on the hydrodeoxygenation of the lignin-derived phenolic compounds: chloroplatinic acid hexahydrate was dissolved in de-ionized water to prepare 5 mL of solution, and a given volume of solution was taken out to make the Pt loading be 1%, and dropwise added to the $MoO_x/ZrO_2$ catalyst prepared in the above preparation method, and then stirred for 8 h with a magnetic stirrer to make the loading uniform, and then placed into a 100° C. drying oven for drying of 12 h; the dried solid was placed into a mortar and fully ground to a powder and next placed into a muffle furnace and quickly heated to 550° C. at the heating rate of 5° C./min and held for 3 h at this temperature to obtain 1% Pt—$MoO_x/ZrO_2$ catalyst.

The performance test method of the catalyst was the same as in the example 1, and the qualitative and quantitative analyses were performed on the hydrodeoxygenation products with GC/MS and GC-FID. The results showed that the conversion rate of the guaiacol was 100%, the deoxygenation rate was 79%, the BTX selectivity was 58%, and the selectivity of the phenolic compounds was 42%.

Example 5

The effect of different reaction temperatures on the hydrodeoxygenation of the lignin-derived phenolic compounds: the catalyst preparation method was the same as in the example 1. The performance test of the 0.3% Pt—$MoO_x/ZrO_2$ catalyst was to perform hydrodeoxygenation reaction of guaiacol on a fixed bed reactor. 30 mg of catalyst and 200 mg of silicon dioxide were weighed and ground and mixed uniformly and loaded between two layers of quartz wool and placed in the middle of the fixed bed. Before reaction, the reactor firstly exhausted in-tube residual air with 80 mL/min $N_2$ and then was heated to 350° C. at the heating rate of 10° C./min in the normal-pressure $H_2$ atmosphere of 60 mL/min, and held for 30 min at this temperature to fully activate the catalyst. The guaiacol was sent into the reactor via an injection pump. The WHSV of the feed rate of the guaiacol relative to the use amount of the catalyst was 2.26 $h^{-1}$. The liquid product was collected by a condensation system of ice water bath and the gas product was collected by an airbag.

The qualitative and quantitative analyses were performed on the hydrodeoxygenation products with GC/MS and GC-FID. The results showed that the conversion rate of the guaiacol was 96%, the deoxygenation rate was 92%, the BTX selectivity was 39%, and the selectivity of the phenolic compounds was 61%.

Example 6

The effect of different reaction temperatures on the hydrodeoxygenation of the lignin-derived phenolic compounds: the catalyst preparation method was the same as in the example 1. The performance test of the 0.3% Pt—$MoO_x$/$ZrO_2$ catalyst was to perform hydrodeoxygenation reaction of guaiacol on a fixed bed reactor. 30 mg of catalyst and 200 mg of silicon dioxide were weighed and ground and mixed uniformly and loaded between two layers of quartz wool and placed in the middle of the fixed bed. Before reaction, the reactor firstly exhausted in-tube residual air with 80 mL/min $N_2$ and then was heated to 450° C. at the heating rate of 10° C./min in the normal-pressure $H_2$ atmosphere of 60 mL/min, and held for 30 min at this temperature to fully activate the catalyst. The guaiacol was sent into the reactor via an injection pump. The WHSV of the feed rate of the guaiacol relative to the use amount of the catalyst was 2.26 $h^{-1}$. The liquid product was collected by a condensation system of ice water bath and the gas product was collected by an airbag.

The qualitative and quantitative analyses were performed on the hydrodeoxygenation products with GC/MS and GC-FID. The results showed that the conversion rate of the guaiacol was 100%, the deoxygenation rate was 96%, the BTX selectivity was 90%, and the selectivity of the phenolic compounds was 10%.

Example 7

The effect of different WHSVs on the hydrodeoxygenation of the lignin-derived phenolic compounds: the catalyst preparation method was the same as in the example 1. The performance test of the 0.3% Pt—$MoO_x$/$ZrO_2$ catalyst was to perform hydrodeoxygenation reaction of guaiacol on a fixed bed reactor. 5 mg of catalyst and 200 mg of silicon dioxide were weighed, and ground and mixed uniformly and loaded between two layers of quartz wool and placed in the middle of the fixed bed. Before reaction, the reactor firstly exhausted in-tube residual air with 80 mL/min $N_2$ and then was heated to 400° C. at the heating rate of 10° C./min in the normal-pressure $H_2$ atmosphere of 60 mL/min, and held for 30 min at this temperature to fully activate the catalyst. The guaiacol was sent into the reactor via an injection pump. The WHSV of the feed rate of the guaiacol relative to the use amount of the catalyst was 13.56 $h^{-1}$ The liquid product was collected by a condensation system of ice water bath and the gas product was collected by an airbag.

The qualitative and quantitative analyses were performed on the hydrodeoxygenation products with GC/MS and GC-FID. The results showed that the conversion rate of the guaiacol was 89%, the deoxygenation rate was 45%, and the phenol selectivity was 100%.

Example 8

The effect of different WHSVs on the hydrodeoxygenation of the lignin-derived phenolic compounds: the catalyst preparation method was the same as in the example 1. The performance test of the catalyst was to perform hydrodeoxygenation reaction of guaiacol on a fixed bed reactor. 20 mg of catalyst and 200 mg of silicon dioxide were weighed and ground and mixed uniformly and loaded between two layers of quartz wool and placed in the middle of the fixed bed. Before reaction, the reactor firstly exhausted in-tube residual air with 80 mL/min $N_2$ and then was heated to 400° C. at the heating rate of 10° C./min in the normal-pressure $H_2$ atmosphere of 60 mL/min, and held for 30 min at this temperature to fully activate the catalyst. The guaiacol was sent into the reactor via an injection pump. The WHSV of the feed rate of the guaiacol relative to the use amount of the catalyst was 3.39 $h^{-1}$. The liquid product was collected by a condensation system of ice water bath and the gas product was collected by an airbag.

The qualitative and quantitative analyses were performed on the hydrodeoxygenation products with GC/MS and GC-FID. The results showed that the conversion rate of the guaiacol was 97%, the deoxygenation rate was 54%, the BTX selectivity was 9% and the selectivity of the phenolic compounds was 93%.

Control Example 1

0.55 g of ammonium molybdate tetrahydrate was dissolved in 6 mL of de-ionized water and stirred for 2 h for full dissolution, and dropwise added to 4.5 g of commercial $ZrO_2$ and stirred for 8 h to make loading uniform, and then placed into a 100° C. drying oven for drying of 12 h; the dried solid was placed into a mortar and fully ground into powder, and next placed into a muffle furnace and quickly heated to 550° C. at the heating rate of 5° C./min, and held for 3 h at this temperature to obtain the $MoO_x$/$ZrO_2$ Com. catalyst.

The performance test of the catalyst was to perform hydrodeoxygenation reaction of guaiacol on a fixed bed reactor. 30 mg of catalyst and 200 mg of silicon dioxide were ground and mixed uniformly and loaded between two layers of quartz wool and placed in the middle of the fixed bed. Before reaction, the reactor firstly exhausted in-tube residual air with 80 mL/min $N_2$ and then was heated to 400° C. at the heating rate of 10° C./min in the normal-pressure $H_2$ atmosphere of 60 mL/min, and held for 30 min at this temperature to fully activate the catalyst. The guaiacol was sent into the reactor via an injection pump. The WHSV of the feed rate of the guaiacol relative to the use amount of the catalyst was 2.26 $h^{-1}$. The liquid product was collected by a condensation system of ice water bath and the gas product was collected by an airbag.

The qualitative and quantitative analyses were performed on the hydrodeoxygenation products with GC/MS and GC-FID. The results showed that the conversion rate of the guaiacol was 8%, the deoxygenation rate was 4%, and the selectivity of the phenolic compounds was 100%.

Control Example 2

11.35 g of zirconyl nitrate was taken and dissolved in de-ionized water to prepare 61.4 mL of solution and stirred for 2 h to realize full dissolution; 9.72 mL of strong ammonia water was taken and dissolved in de-ionized water to prepare 180 mL of dilute ammonia water solution; the zirconyl nitrate solution was dropwise added to the dilute ammonia water solution and stirred fully for 2 h with a magnetic stirrer and then placed in a 100° C. drying oven for 24 h aging; after the mixture solution was cooled to room temperature, the mixture solution was suction-filtered with a vacuum pump and washed to neutral with de-ionized water, and then placed into a 100° C. drying oven for drying of 12 h; the dried solid was placed into a mortar and fully ground into powder, and next placed into a muffle furnace and quickly heated to 400° C. at the heating rate of 5° C./min, and held for 4 h at this temperature so as to obtain a solid powder as $ZrO_2$.

0.55 g of ammonium molybdate tetrahydrate was dissolved in 6 mL of de-ionized water and stirred for 2 h for full dissolution, and dropwise added to 4.5 g of $ZrO_2$ and stirred for 8 h to make loading uniform, and then placed into a 100° C. drying oven for drying of 12 h; the dried solid was placed into a mortar and fully ground into powder, and next placed into a muffle furnace and quickly heated to 550° C. at the heating rate of 5° C./min, and held for 3 h at this temperature to obtain the $MoO_x/ZrO_2$ catalyst.

The performance test method of the catalyst was the same as in the control example 1. The qualitative and quantitative analyses were performed on the hydrodeoxygenation products with GC/MS and GC-FID. The results showed that the conversion rate of the guaiacol was 73%, the deoxygenation rate was 36.5%, the phenol selectivity was 58%, and the cresol selectivity was 42%.

Control Example 3

The preparation method of the $MoO_x/ZrO_2$ Com. catalyst was the same as in the control example 1. The Pt precursor was dissolved in de-ionized water to prepare 5 mL of solution, and a given volume of solution was taken out to make the Pt loading be 0.3%, and dropwise added to the solid powder prepared above, and then stirred for 8 h with a magnetic stirrer to make the loading uniform, and then placed into a 100° C. drying oven for drying of 12 h; the dried solid was placed into a mortar and fully ground to a powder and next placed into a muffle furnace and quickly heated to 550° C. at the heating rate of 5° C./min and held for 3 h at this temperature to obtain 0.3% Pt—$MoO_x/ZrO_2$ Com. catalyst.

The performance test method of the catalyst was the same as in the control example 1. The qualitative and quantitative analyses were performed on the hydrodeoxygenation products with GC/MS and GC-FID. The results showed that the conversion rate of the guaiacol was 85%, the deoxygenation rate was 64%, the BTX selectivity was 35%, and the selectivity of the phenolic compounds was 65%.

The example 1 differs from the control example 2 in that Pt is loaded in the example 1 while no Pt is loaded in the control example 2. It can be seen that although the catalyst prepared in the control example 2 has activity and selectivity, its effect is far less than that of the catalyst prepared in the example 1 with loaded Pt.

In the examples 1 to 4, the Pt content increases gradually. It can be seen that the excessively high Pt loading can cause the catalyst to be over-reduced, leading to lower hydrodeoxygenation activity of the catalyst. The catalyst with 0.3% loading has the highest deoxygenation rate and BTX selectivity.

Through comparison of the example 1 with the examples 5 and 6, it can be seen that, at a relatively low reaction temperature, the guaiacol is not fully converted and the BTX selectivity is obviously lowered; at an increased reaction temperature, the conversion rate is 100%, but the catalytic activity and selectivity effect are slightly lower than those in the example 1.

Through comparison of the example 1 with the examples 7 and 8, it can be seen that, different WHSVs have great impact on the catalytic activity and product selectivity. The reduced use amount of the catalyst causes the guaiacol not to be fully converted, and the deoxygenation rate and the target product BTX selectivity are obviously lowered.

Through comparison of the control example 1 and the control example 2, it can be seen that the $MoO_x/ZrO_2$ Com. catalyst with commercial $ZrO_2$ as carrier has a conversion rate of only 8% for the guaiacol, which is far lower than the conversion rate 73% of the $MoO_x/ZrO_2$ with oxygen-vacancy-rich $ZrO_2$ as carrier.

Through comparison of the example 1 and the control example 3, it can be seen that, compared with the catalyst prepared with commercial $ZrO_2$, the self-made oxygen-vacancy-rich 0.3% Pt—$MoO_x/ZrO_2$ catalyst has pretty high conversion rate and deoxygenation rate and selectively adjusts the target products BTX.

FIG. 1 is a characterization diagram of XPS of the catalysts of the example 1 and the control examples 1, 2, and 3 in the present disclosure. In the FIG. 1, Mo—Zr Com. represents the XPS characterization diagram of the catalyst prepared in the control example 1; Mo—Zr represents the XPS characterization diagram of the catalyst prepared in the control example 2; 0.3 Pt—Mo—Zr Com represents the XPS characterization diagram of the catalyst prepared in the control example 3; 0.3 Pt—Mo—Zr is the XPS characterization diagram of the catalyst prepared in the example 1. From the drawing, it can be seen that the oxygen-vacancy-rich catalyst prepared in the present disclosure can effectively inhibit over-reduction of the Mo species and help the adsorption of the catalyst for the oxygen-containing groups, thereby effectively improving the HDO activity and stability of the catalyst.

Figure 2:
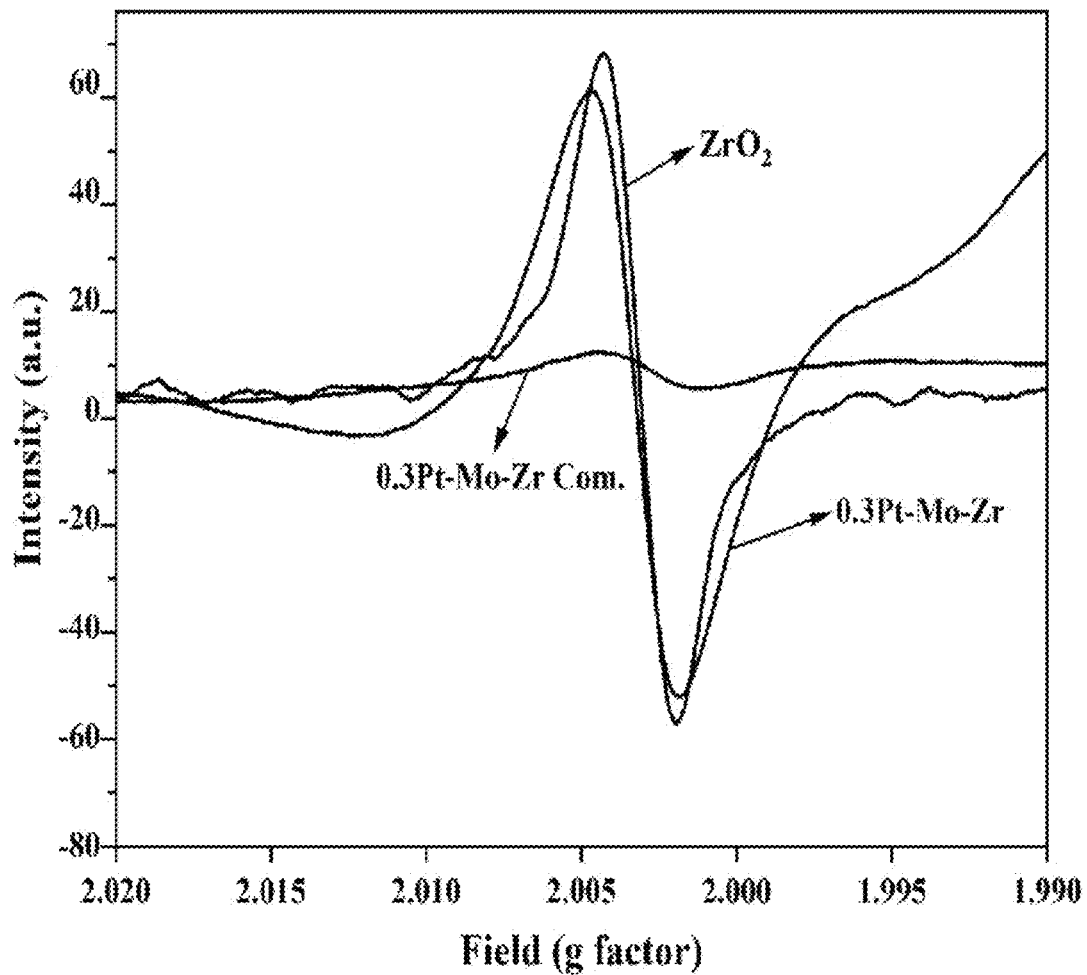
FIG. 2 is a characterization diagram of EPR of oxygen-vacancy-rich ZrO$_2$ solid catalyst prepared in the present disclosure.

FIG. 2 is a characterization diagram of EPR of oxygen-vacancy-rich $ZrO_2$ solid catalyst prepared in the present disclosure. In the drawing, $ZrO_2$ represents the EPR characterization diagram of the solid powder $ZrO_2$ prepared in the example 1, 0.3 Pt—Mo—Zr is the EPR characterization diagram of the catalyst prepared in the example 1, and 0.3 Pt—Mo—Zr Com is the EPR characterization diagram of the catalyst prepared in the control example 3. It can be seen from the drawing that, compared with the commercial $ZrO_2$, the oxygen-vacancy-rich $ZrO_2$ prepared in the present disclosure has rich oxygen vacancies.

The above examples are only preferred examples of the present disclosure and not intended to limit the technical scope of the present disclosure. Any tiny changes, equivalent changes and modifications made to the above examples based on the technical essence of the present disclosure shall all fall within the scope of protection of the present disclosure.

What is claimed is:

1. A preparation method of an oxygen-vacancy-rich $MoO_x/ZrO_2$ catalyst in hydrodeoxygenation of a biomass gas-solid system, comprising the following steps:
   (1) preparation of oxygen-vacancy-rich $ZrO_2$: dissolving zirconyl nitrate and ammonia water in de-ionized water respectively and then mixing fully and performing aging, cooling, filtering, washing, and drying to obtain a solid powder and calcining the solid powder in an air atmosphere to obtain a $ZrO_2$ solid;
   (2) adding ammonium molybdate tetrahydrate into de-ionized water for dissolution, stirring and dropwise adding into the $ZrO_2$ solid obtained in the step (1), and mixing to make loading uniform, and then drying to obtain a first solid, and then grinding the first solid and calcining in the air atmosphere to obtain an $MoO_x/ZrO_2$ powder; and
   (3) adding a Pt precursor into de-ionized water for dissolution, and dropwise adding into the $MoO_x/ZrO_2$ powder obtained in the step (2) and stirring to make loading uniform, and then drying to obtain a second solid, and then grinding the second solid and calcining in the air atmosphere to obtain a Pt—MoO$_x$/ZrO$_2$ catalyst.

2. The preparation method of the oxygen-vacancy-rich MoO$_x$/ZrO$_2$ catalyst in hydrodeoxygenation of the biomass gas-solid system according to claim 1, wherein in the step (1), a mixture aging temperature is 80° C. to 120° C. with a time of 12 h to 36 h.

3. The preparation method of the oxygen-vacancy-rich MoO$_x$/ZrO$_2$ catalyst in hydrodeoxygenation of the biomass gas-solid system according to claim 1, wherein in the step (1), a calcination condition is as follows: a temperature is 300° C. to 500° C., a heating rate is 5 to 8° C./min, and a holding time is 2 h to 4 h;

in the step (2), a calcination condition is as follows: a temperature is 450° C. to 800° C., a heating rate is 5 to 8° C./min, and a holding time is 2 h to 4 h;

in the step (3), a calcination condition is as follows: a temperature is 450° C. to 800° C., a heating rate is 5 to 8° C./min, and a holding time is 2 h to 4 h.

4. The preparation method of the oxygen-vacancy-rich MoO$_x$/ZrO$_2$ catalyst in hydrodeoxygenation of the biomass gas-solid system according to claim 1, wherein in the step (2), a weight ratio of the ammonium molybdate tetrahydrate to the ZrO$_2$ solid is 1/15 to 1/5.

5. The preparation method of the oxygen-vacancy-rich MoO$_x$/ZrO$_2$ catalyst in hydrodeoxygenation of the biomass gas-solid system according to claim 1, wherein in the step (3), the Pt precursor comprises chloroplatinic acid hexahydrate or platinum nitrate.

6. A method of applying an oxygen-vacancy-rich MoO$_x$/ZrO$_2$ catalyst in hydrodeoxygenation of a biomass gas-solid system prepared by the preparation method according to claim 1, wherein the oxygen-vacancy-rich MoO$_x$/ZrO$_2$ catalyst in hydrodeoxygenation of the biomass gas-solid system is Pt—MoO$_x$/ZrO$_2$, wherein a loading of a noble metal Pt is 0.1% to 1%, and x is 2 to 3, wherein the method comprises applying the Pt—MoO$_x$/ZrO$_2$ catalyst to a hydrodeoxygenation reaction of lignin and derivative phenolic compounds of the lignin.

7. The method according to claim 6, wherein the hydrodeoxygenation reaction proceeds in a fixed bed with a reaction temperature of 350° C. to 450° C.

8. The method according to claim 6, wherein the hydrodeoxygenation reaction proceeds under a normal pressure.

9. The method according to claim 6, wherein the Pt—MoO$_x$/ZrO$_2$ catalyst is heated to a temperature of 350° C. to 450° C. at a heating rate of 5 to 15° C./min in an H$_2$ atmosphere before use, and held for 20 min to 40 min under the temperature to fully activate the Pt—MoO$_x$/ZrO$_2$ catalyst.

* * * * *